June 3, 1958 C. J. McDOWALL ET AL 2,836,959
GAS TURBINE ENGINE SUPPORTING FRAME
Original Filed Jan. 11, 1950 3 Sheets-Sheet 3

Inventors
Charles J. McDowall &
By Oscar V. Montieth
Paul Fitzpatrick
Attorney

United States Patent Office 2,836,959
Patented June 3, 1958

2,836,959

GAS TURBINE ENGINE SUPPORTING FRAME

Charles J. McDowall and Oscar V. Montieth, Indianapolis, Ind., assignors to General Motors Corporation, Detroit, Mich., a corporation of Delaware Original application January 11, 1950, Serial No. 138,026, now Patent No. 2,763,462, dated September 18, 1956. Divided and this application March 21, 1956, Serial No. 572,861

9 Claims. (Cl. 60—39.31)

This invention relates to combustion engines and more particularly to axial flow gas turbine power plants. This application is a division of our application Serial No. 138,026 filed January 11, 1950 (now Patent 2,763,462 issued September 18, 1956).

This invention relates to an axial flow compressor turbine power unit, which provides a propeller drive and a supplemental jet power source. The compressor and turbine are mounted coaxially with the compressor at the forward end. The propeller is connected to the forward end of the compressor. The air passes over suitable fairing and enters the axial flow compressor where it is compressed. Then the main portion of the air enters the combustion chamber or burner and the remainder passes around the combustion chamber to cool it. The combustion chamber is expansible and is mounted on fixed supports at the forward end and in a splined support to allow axial sliding due to expansion at the rear end. The complete compressor turbine power unit is supported from a torque ring which is centrally located. A cylindrical shell is secured to the torque ring and extends rearwardly surrounding the turbine unit, and provides an outboard support for the rear bearing. The turbine stator blading comprises a series of segments with interengaging tongues which interfit in a series of annular rings. The annular rings are secured together to provide the exterior conical casing for the turbine. This casing is supported by a splined joint with the cylindrical shell. The rotor wheels are secured to the main shaft by suitable splines, and are centered about the shaft by annular wedge-shaped elements engaging each side of the wheels. The wheels support suitable turbine rotor blades which rotate between the stator blades.

The primary object of this invention is to provide a supporting structure for a compressor turbine power unit with provision for expansion in the power unit.

Another object of the invention is to provide in a compressor turbine power unit a burner or combustion chamber having a fixed support at one end and an axially sliding support at the other end, in order to provide for relative expansion between the combustion chamber and the other portions of the power plant.

Another object of the invention is to provide in a turbine used in a combustion engine power plant a supporting shell surrounding the turbine and connected to the turbine by means of a splined joint, and bearing support means secured to the turbine casing to support the rear end of the main shaft and to provide relative expansion of the shell and casing.

These and other objects of the invention will be more apparent from the following description and drawings of a preferred embodiment of the invention.

Figure 1:
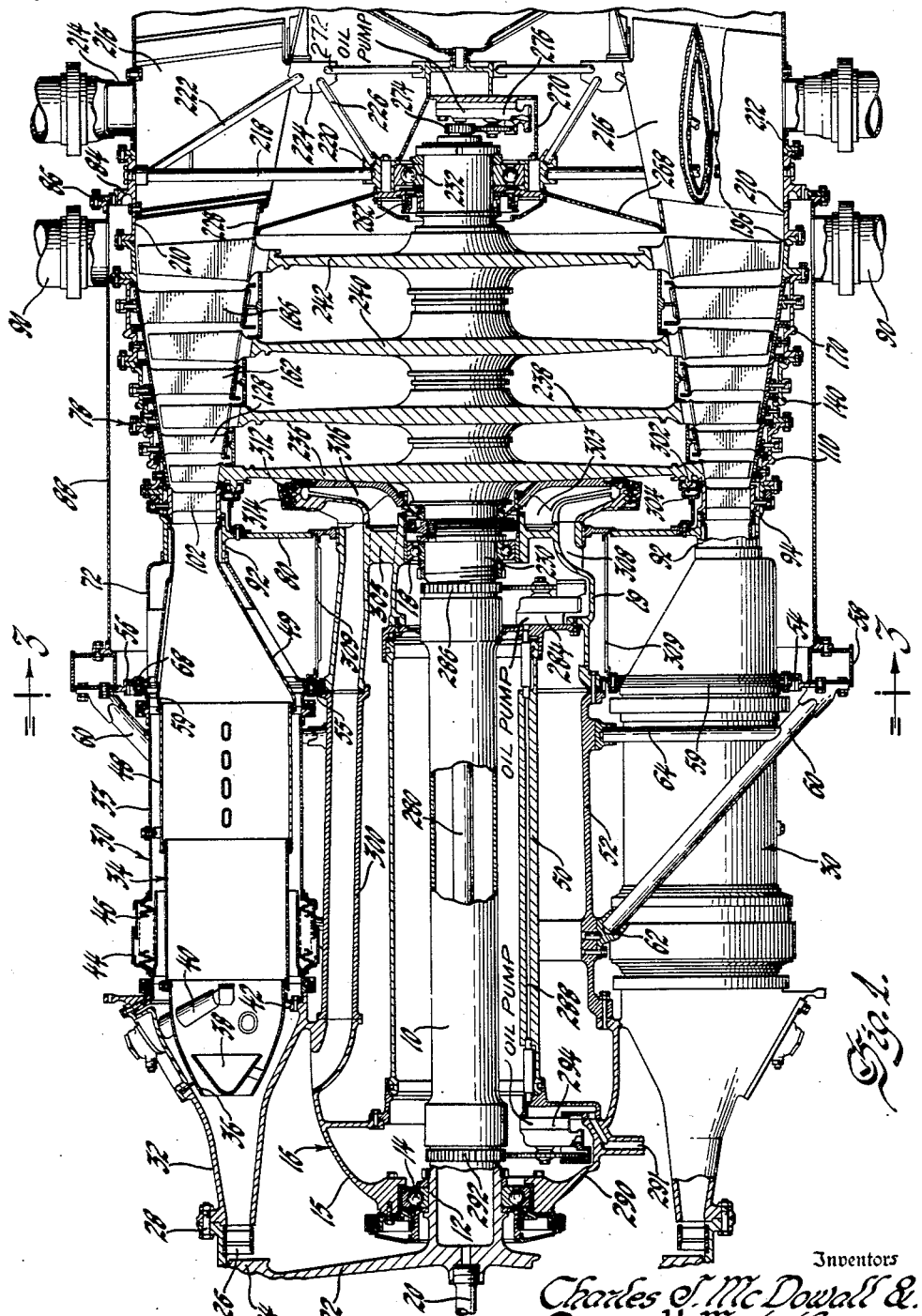
Figure 1 is an elevation view, with parts in section, of the compressor turbine power unit.

The compressor turbine unit illustrated in the drawing is built around a floating shaft 10 which is connected at its forward end to a compressor shaft 12. The compressor shaft 12 is rotatably supported by bearing 14 mounted in the forward end 15 of the power plant housing 16. The rear portion of the shaft 10 just forward of the turbine is supported and rotatably secured to turbine shaft 230 by a splined connection (not illustrated). The end of shaft 230 adjacent the splined connection is supported by a bearing 18 in the rear portion 19 of housing 16. A propeller drive shaft (not shown) may be connected to the forward end of the compressor assembly. The compressor assembly consists of a rear compressor shaft 12 and a series of wheels 22 which support suitable rotatable compressor blading 24 and are held together by the tie rod 20. The air enters through a suitable faired compressor entrance (not shown) and is compressed by the compressor rotary blades 24 and stator blades 26 or diffuser vanes mounted in the compressor housing 28. A plurality of combustion chambers or burners 30 are arranged around shaft 10 between the compressor and turbine. Each burner 30 has an enlarging passage 32 connecting a sector of the outlet of the compressor to the central cylindrical portion 33 of the burner 30. The liner 34 has a central cylindrical portion spaced from the burner 30. The forward end 36 of the liner has a reduced diameter and is spaced from the walls of the passage 32 so that a portion of the air flows between the liner 34 and the burner housing 30 to cool the liner.

An air baffle or flame holder 38 is mounted at the forward end of the liner directly in front of the fuel nozzle 40. The liner 34 is supported by suitable spaced supports 42 to the burner 30. The forward passage portion 32 of the burner 30 may be formed integral with or secured to the casing 16. To the rear of the supports 42 the burner housing 30 has an enclosure 44 formed of a pair of spaced overlapping wall portions which provides protection for a corrugated metal expansion diaphragm 46 to seal the joint. A central portion 48 of the liner 34 has a sliding joint with the forward end and the rear end 49 of the liner. These expansion and sliding joints provide means to permit expansion and also allow quick disassembly and replacement of the combustion chamber as fully explained in U. S. Patent 2,748,567 issued June 5, 1956, on the co-pending application Serial No. 121,105 of Floyd G. Dougherty, filed October 13, 1949.

Figure 2:
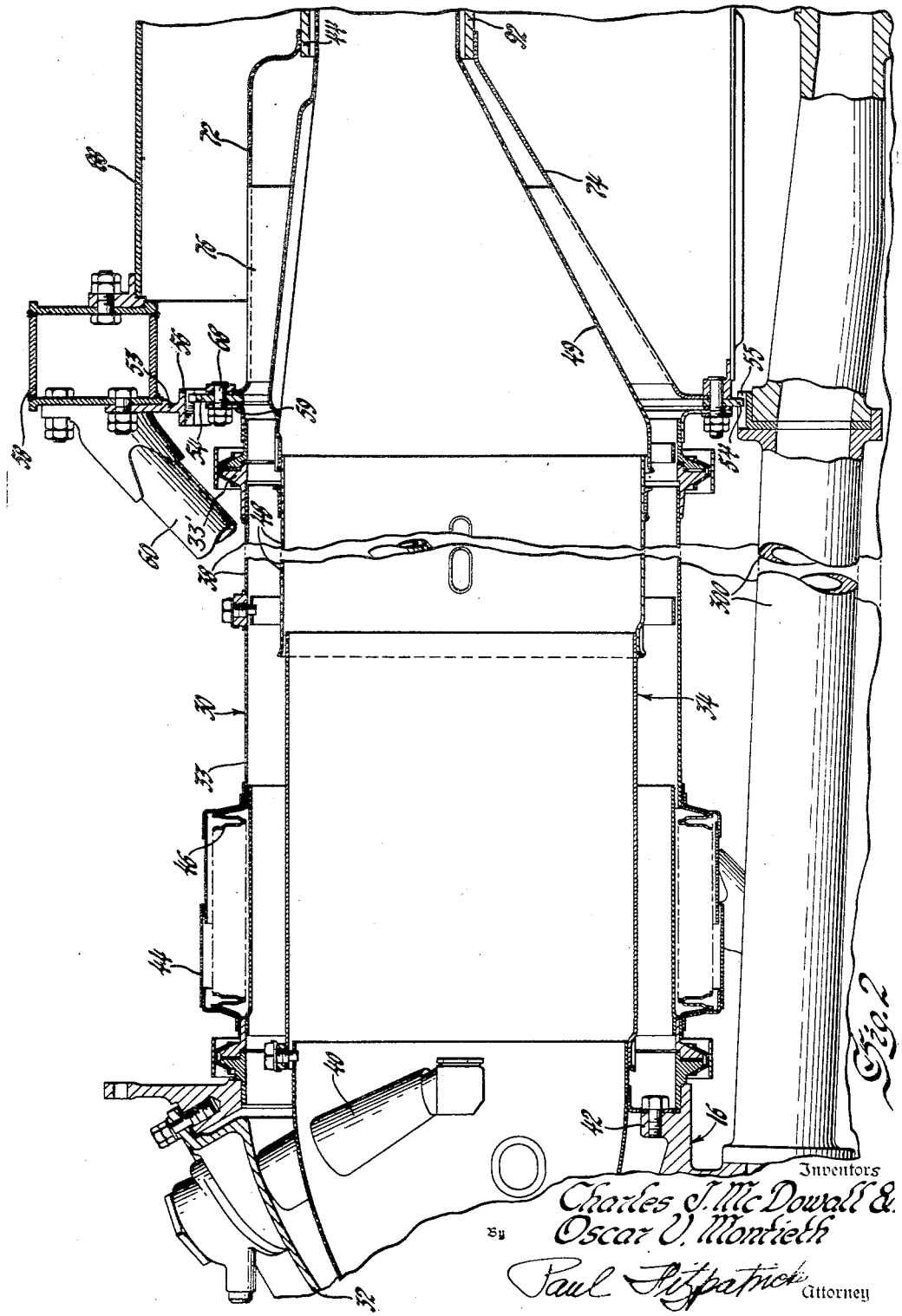
Figure 2 is a fragmentary enlarged elevation, with parts in section, of the combustion chamber.
Figure 3:
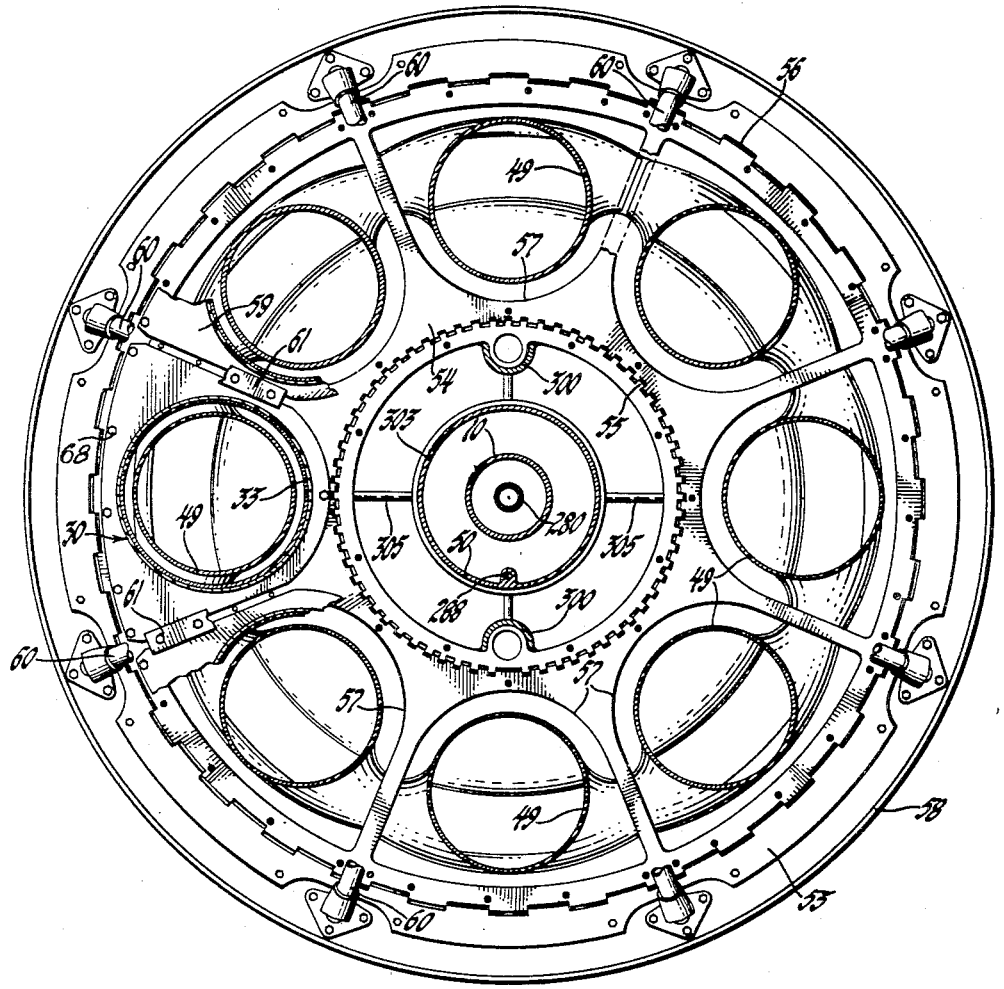
Figure 3 is a section of Figure 1 on the line 3—3 with parts broken away.

The central housing 16 has a central sleeve 50 and an external sleeve 52 extending from the forward bearing support 15 to rear bearing support 19. An annular plate 54 surrounds the external sleeve 52 of the housing 16 and is fixed against rotation by interengaging splines 55 secured to the external sleeve 52. The plate 54 is fixed against rotation at its outer perimeter to a ring 53 by interengaging splines 56 on the outer edge of the plate and the inner edge of the ring. The ring 53 is bolted to the torque ring 58. The splines allow axial movement of the annular plate with respect to the ring 53 and the frame 16. The torque ring 58, which has a box section, is braced by a plurality of diagonal struts 60 suitably connected to the ring 58 at spaced intervals and secured to the sleeve 52 by brackets 62. Radial bracing struts 64 are secured to struts 60 and the sleeve 52. The plate 54 has an annularly disposed series of sector shaped apertures 57 for the combustion chambers 30. As shown in Figure 2, the outer shell 33 of the burner 30 has a flange 33' suitably secured to the sector plate 59. The plate 59 has a circular aperture for the burner and is secured at its inner and outer edges by suitable means such as bolts 68 to the annular plate 54. The sides of the sector plates 59 seat on the annular plate 54 between the apertures 57 and are clamped in position by clamping bars 61. As explained above, the rear end of the burner 30 is attached to the forward side of the plate 54. The burner liner transition sections 49 are surrounded by an annular wall 72. This wall 72 is secured at its forward end to the rear side of plate 54 by bolts 68 and fits over the outer surface of the turbine inlet 92. An inner annular wall 74 is disposed between the burners and the main shaft. This wall 74 is secured at the forward end to the inner end of plate 54 by bolts and engages the inner surface of the turbine inlet 92. The inner wall 74 and outer wall 72 are concentric with the shaft and provide an annular space for the series of liner transition sections 49. A plurality of ducts 76 connect the walls 72 and 74 to provide for the passage of cooling air from the space between the shaft housing and the inner wall 74 to the space between outer wall 72 and cylindrical housing 88.

The turbine stator housing 78 is supported at the forward end by the outer portion of an annular plate 80 which is piloted or slidably supported on the outer cylindrical portion of the housing at the rear bearing support 19. The rear end of the housing 78 has an annular splined flange 84 which is slidably supported in an annular flange 86 secured to the cylindrical shell 88 supported on the torque ring 58. The cylindrical shell 88 has an outlet conduit 90 for the cooling air. The stator housing which is supported at its forward end on the annular plate 80 consists of a plurality of annular rings bolted together. The plate 80 has near its perimeter an aperture having the shape of an annular segment for each combustion chamber. Each of these apertures is bounded by a wide flange 92 to support the end of the burner.

The turbine stator structure comprises the rigid housing 78 composed of a number of rings bolted together, with stator vane segments for each stage and fairings or shrouds for the turbine wheels mounted in the housing. This structure is the claimed subject matter of the parent application Serial No. 138,026 referred to above (Patent 2,763,462 issued September 18, 1956). Since the details thereof are immaterial to the present invention, they are omitted from this specification in the interest of conciseness.

The housing rings (Figure 1) are 94, 110, 140, 170, and 196. The stator vane assemblies for the several stages are 102, 128, 162, and 186. The housing ring 196 has a rear flange which is suitably secured and interlocked by means of axial and radial portions to the forward flange of the supporting ring 210. The supporting ring 210 may be made integral with the splined flange 84 which slidably supports the assembly from the cylindrical shell 88. At the rear of the supporting ring 210 a jet fairing ring or tail cone 212 is secured. An inlet conduit 214 is connected to the jet fairing ring to bring cooling air to the interior of the double walled flow vanes 216.

Radial bearing support struts 218 are secured to the supporting ring 210 at the outer end and at the inner end to the bearing support member 220. Diagonal struts 222 extend from the outer ends of the radial struts 218 to the gussets 224. The gussets 224 are connected by inner diagonal struts 226 to the bearing support 220. The gussets 224 support the interior ring or wall 228 of the jet passage. As shown in Figure 1 the turbine shaft 230 extends from the central bearing 18 to the rear bearing 232 which is mounted in the bearing support 220. Shaft 230 mounts the bladed turbine wheels 236, 238, 240, and 242 between which are supported sealing rings cooperating with the second to fourth stage stator vane rings. The details of the rotor structure are omitted in the interest of conciseness, as they are described in the aforementioned parent application and are immaterial to the present invention.

Just to the rear of the last wheel 242 an annular panel 268 closes the space between the bearing support 220 and the inner wall 228 of the jet passage. There are spaces between the strut anchorages in member 220 through which air coming from inlet 214 and passing through vanes 216 to the other side of partition 268 is sucked out between partition 268 and wheel 242 into the flow of gas in the jet passage. This air flow cools the rear bearing 232. The bearing support 220 also supports an oil pump housing and sump 270. The rear end of the oil sump 270 is supported by radial struts 272 attached to the gussets 224. A gear 274 attached to the end of shaft 230 drives the return oil pump 276 which pumps oil into the space between a sleeve (not shown) in shaft 230 and the conduit 280. The oil flows from a main oil pump (not shown) through the hollow tie bolt 20 and compressor shaft 12 to lubricate forward bearing 14 and through conduit 280 in floating shaft 10 to lubricate central bearing 18 and through conduit 280 in shaft 230 to bearing 232. The conduit 280 acts as a tie bolt to hold shaft 10 and shaft 230 together. At the forward side of bearing 232 a seal 282 prevents the flow of oil into the turbine space. The oil lubricates bearing 232 and drops into sump 270 where pump 276 returns the oil through the space between shaft 230 and conduit 280 to the sump in the base of bearing support 19. The bearing support 19 has a portion providing a sump for oil pump 284 which is driven by gear 286 on floating shaft 10. The pump 284 lifts the oil from the sump in support 19 and forces the oil through passage 288 and into passage 291 in the forward end of the housing 52. The oil from bearing 14 flows into the sump 290 in the lower portion of the bearing support housing 16. A gear 292 on shaft 10 drives a gear pump 294 which returns the oil from sump 290 to the main oil tank through passage 291.

In order to reduce the end thrust on the compressor-turbine rotor assembly conduits 300 are provided as shown in Figure 1 to connect the air space on the rear side of the compressor wheel with the air space on the forward side of the turbine wheel in order to balance the gas forces. The first turbine wheel 236 has an axially extending flange 302 which extends into a labyrinth seal 304. Cooling air is also circulated through the center of the housing and around the sleeve 50 by centrifugal impeller blades 306 mounted on the shaft 230 close to the forward face of turbine wheel 236. This cooling air is admitted by an inlet (not shown). The impeller blades 306 draw air from the center region between sleeve 50 and housing 52 past fins 305 and about the bearing 18 and force the air out through the passage 308 and apertures in partition 309 and through the hollow ducts 76 between the burners 30 to the outlet 90 in the cylindrical support 88. A flange 312 is secured to the cooling impeller immediately above the passage 308 and interfits with the annular labyrinth seal element 314 on the fan housing to prevent leakage between the cooling air passage and the equalizer passage.

The compressor turbine power unit propels the ship by means of a propeller driven through the compressor rotor assembly mounted on the forward end of the main shaft and of the jet reaction. The air enters at the forward end of the power unit and is compressed by the compressor unit consisting of rotor blades 24 and stator blades 26, and enters the burners 30 where fuel is supplied by the nozzle 40. The hot gases are then produced in the combustion chamber and rapidly flow through the combustion chamber to the turbine. In the turbine the gases expand and drive the turbine in the conventional way. Due to the fact that high combustion heats are localized in the combustion chambers and adjacent the turbine blading, there is a large temperature difference between various parts of the power plant and thus large differences in the expansion of various parts of the machine. In order to permit this expansion without destruction or distortion of the power plant the important elements of the unit are mounted to allow for expansion between them. The burners are fixed at their forward end to the frame 16 but are fixed at their rear end in an annular plate which is mounted for sliding movement to allow for expansion. An expansion joint 44—46 is also provided in each burner 30 to provide for the differential expansion between the burners and the frame between the forward end of the housing 52 and the annular thrust plate 54. The aft portion of the turbine assembly is supported by the shell 88 by means of the splined connection 84—86 in order to allow for differential expansion between the support means and the turbine assembly. Thus the combustion chamber and the turbine assembly can expand relative to their supports without deforming or straining any portion of the power plant.

It will be appreciated that the above described embodiment of the invention is illustrative of the various features of the invention and that many modifications of the invention may be made within the scope of the appended claims.

We claim:

1. In a rotary engine, a frame having bearings for a central shaft, a torque ring surrounding said frame, struts supporting said frame within said torque ring, a cylindrical support secured to said torque ring and extending rearwardly, a rear bearing for a central shaft, and rear struts connecting said rear bearing and said cylindrical support.

2. In a rotary engine, a frame having bearings for a central shaft, a torque ring surrounding said frame, struts supporting said frame within said torque ring, a cylindrical support secured to said torque ring and extending rearwardly, a rear bearing for a central shaft, rear struts connecting said rear bearing to a support ring, and means connecting said cylindrical support and said support ring to prevent relative rotation and allow relative axial movement.

3. In a rotary engine, a frame having a forward and a central bearing for the engine shaft, a torque ring surrounding the rear portion of said frame, means connecting said torque ring to said frame, a plurality of burners mounted around said frame, the forward end of each burner being secured to said frame, an annular plate between the torque ring and frame with apertures for said burners, means securing the burners to said annular plate, and interengaging means between the outer edge of said plate and said torque ring and the inner edge of said plate and said frame to prevent relative rotary movement and to permit relative axial movement between the parts.

4. In a rotary engine, a frame having a forward and a central bearing for the engine shaft, a torque ring surrounding the rear portion of said frame, means connecting said torque ring to said frame, a plurality of burners mounted around said frame, the forward end of each burner being secured to said frame, an annular plate between the torque ring and frame with apertures for said burners, means securing the burners to said annular plate, interengaging means between the outer edge of said plate and said torque ring and the inner edge of said plate and said frame to prevent relative rotary movement and to permit relative axial movement between the parts, a cylindrical support secured to said torque ring and extending rearwardly, and a turbine stator mounted in said cylindrical support and secured at the forward end to said frame and at the rear end to said cylindrical support by interengaging means preventing rotary movement and permitting axial movement.

5. In a rotary engine, a frame having a forward and a central bearing for the engine shaft, a torque ring surrounding the rear portion of said frame, means connecting said torque ring to said frame, a plurality of burners mounted around said frame, the forward end of each burner being secured to said frame, an annular plate between the torque ring and frame with apertures for said burners, means securing the burners to said annular plate, interengaging means between the outer edge of said plate and said torque ring and the inner edge of said plate and said frame to prevent relative rotary movement and to permit relative axial movement between the parts, a cylindrical support secured to said torque ring and extending rearwardly, a rear bearing, a supporting annular frame for said rear bearing, and interengaging splines on said annular frame and said cylindrical support to rotatively position said annular support but permit axial sliding movement.

6. In a rotary engine, a frame having a forward and a central bearing for the engine shaft, a torque ring surrounding the rear portion of said frame, struts connecting said torque ring to said frame, a plurality of burners mounted around said frame, the forward end of each burner being secured to said frame, an annular plate between the torque ring and frame with apertures for said burners, means securing the burners to said annular plate, interengaging splines between the outer edge of said plate and said torque ring and the inner edge of said plate and said frame to prevent relative rotary movement and to permit relative axial movement between the parts, a cylindrical support secured to said torque ring and extending rearwardly, a rear bearing, a supporting annular frame for said rear bearing, and interengaging splines on said annular frame and said cylindrical support to rotatively position said annular support but permit axial sliding movement.

7. In a rotary engine, a frame having a forward and a central bearing, an engine shaft mounted in said bearings, a torque ring surrounding the rear portion of said frame, means connecting said torque ring to said frame, a plurality of burners mounted around said frame, the forward end of each burner being secured to said frame, an annular plate between the torque ring and frame with apertures for said burners, means securing the burners to said annular plate, interengaging splines between the outer edge of said plate and said torque ring and the inner edge of said plate and said frame to permit relative axial movement between the parts, a cylindrical support secured to said torque ring and extending rearwardly, a stator having a plurality of rings positioned within said cylindrical support, said stator being secured at the forward end to said frame, interengaging splines on the rear portion of said stator and said cylindrical support to rotatively position said stator but permit axial sliding, and a rear bearing supported from said stator for said shaft.

8. In a rotary engine, a frame having a forward and a central bearing, an engine shaft mounted in said bearings, a torque ring surrounding said frame, means connecting said torque ring to said frame, a plurality of burners mounted around said frame, the forward end of each burner being secured to said frame, an annular plate between the torque ring and frame with apertures for said burners, means securing the burners to said annular plate, interengaging means between the outer edge of said plate and said torque ring and the inner edge of said plate and said frame to permit relative axial movement between the parts, a cylindrical support secured to said torque ring and extending rearwardly, a stator within said cylindrical support and secured at the forward end to said frame, interengaging means on the rear portion of said stator and said cylindrical support to rotatively position said stator but permit axial sliding, and a rear bearing supported from said stator for said shaft.

9. In a rotary engine, a frame having a forward and a central bearing, an engine shaft mounted in said bearings, a torque ring surrounding the rear portion of said frame, struts connecting said torque ring to said frame, a plurality of burners mounted around said frame, the forward end of each burner being secured to said frame, an annular plate between the torque ring and frame with apertures for said burners, means securing the burners to said annular plate, interengaging splines between the outer edge of said plate and said torque ring and the inner edge of said plate and said frame to permit relative axial movement between the parts, a cylindrical support secured to said torque ring and extending rearwardly, a stator having a plurality of rings positioned within said cylindrical support, a conical lining composed of annular segments secured in said stator, said stator being secured at the forward end to said frame, interengaging splines on the rear portion of said stator and said cylindrical support to rotatively position said stator but permit axial sliding, and a rear bearing supported from said stator for said shaft.

References Cited in the file of this patent
UNITED STATES PATENTS

| | | |
|---|---|---|
| 2,594,808 | Rubbra | Apr. 29, 1952 |
| 2,711,631 | Willgoos | June 28, 1955 |